(12) United States Patent
Hamada et al.

(10) Patent No.: US 12,243,222 B2
(45) Date of Patent: Mar. 4, 2025

(54) DISMANTLING PROCEDURE SELECTING APPARATUS, DISMANTLING PROCEDURE SELECTING METHOD, AND DISMANTLING APPARATUS

(71) Applicant: Panasonic Intellectual Property Management Co., Ltd., Osaka (JP)

(72) Inventors: Shingo Hamada, Osaka (JP); Syougo Utumi, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 345 days.

(21) Appl. No.: 17/807,852

(22) Filed: Jun. 20, 2022

(65) Prior Publication Data

US 2023/0021714 A1 Jan. 26, 2023

(30) Foreign Application Priority Data

Jul. 26, 2021 (JP) .................................. 2021-121688

(51) Int. Cl.
*G06T 7/00* (2017.01)
*G06Q 10/0633* (2023.01)
(Continued)

(52) U.S. Cl.
CPC .......... *G06T 7/001* (2013.01); *G06Q 10/0633* (2013.01); *G06T 1/0014* (2013.01);
(Continued)

(58) Field of Classification Search
CPC .......... G06T 7/001; G06T 1/0014; G06T 7/74; G06T 2207/30164; G06Q 10/0633;
(Continued)

(56) References Cited

U.S. PATENT DOCUMENTS

2004/0215351 A1 10/2004 Kiire et al. ........... B65F 1/1484
2022/0032397 A1\* 2/2022 Ivkovich ............... G06T 7/0008

FOREIGN PATENT DOCUMENTS

CN 110065068 \* 4/2021 ............ B25J 9/1669
JP 5-157518 6/1993
(Continued)

OTHER PUBLICATIONS

Extended European Search Report issued Dec. 2, 2022 in corresponding European Patent Application No. 22183140.7.

*Primary Examiner* — Jerome Grant, II
(74) *Attorney, Agent, or Firm* — Wenderoth, Lind & Ponack, L.L.P.

(57) ABSTRACT

A dismantling procedure selecting apparatus includes a dismantling information storage unit that stores a plurality of pieces of dismantling information respectively including a plurality of predetermined dismantling procedures for a plurality of dismantled objects each used as a reference for dismantling an object to be dismantled, a whole detector that captures a whole image of the object to be dismantled, a detail detector that captures an image of at least a portion of the object to be dismantled, and a dismantling procedure deriving unit that extracts a first feature as a feature of the object to be dismantled based on data obtained by capturing an image by at least one of the whole detector and the detail detector, obtains a degree of matching between the first feature and each of a plurality of second features that are respectively features of a plurality of dismantled objects, and selects a dismantling procedure associated with one of a plurality of the dismantled objects having a second feature having a highest degree of matching among a plurality of second features.

13 Claims, 12 Drawing Sheets

(51) Int. Cl.
    *G06T 1/00*          (2006.01)
    *G06T 7/73*          (2017.01)
    *G06V 10/44*        (2022.01)
    *G06V 10/77*        (2022.01)

(52) U.S. Cl.
    CPC .............. *G06T 7/74* (2017.01); *G06V 10/443* (2022.01); *G06V 10/7715* (2022.01); *G06T 2207/30164* (2013.01)

(58) Field of Classification Search
    CPC . G06V 10/443; G06V 10/7715; Y02W 30/82; B09B 3/00
    USPC ........................................................ 382/103
    See application file for complete search history.

(56) References Cited

FOREIGN PATENT DOCUMENTS

| | | | |
|---|---|---|---|
| JP | 2004-202422 | 7/2004 | |
| JP | 2004-226197 | 8/2004 | |
| JP | 2004-321968 A | 11/2004 | ............. G06Q 10/06 |
| JP | 6051501 | 12/2016 | |
| JP | 6051501 B | 12/2016 | |
| WO | WO2014080733 * | 5/2014 | ......... G05B 19/4097 |

\* cited by examiner

| FEATURE | DEGREE OF MATCHING | DISMANTLING PROCEDURE |
|---|---|---|
|  | 98.5% | A |
|  | 1.0% | B |
|  | 0.5% | C |
|  | ... | ... |

FIG. 11

DISMANTLING PROCEDURE SELECTING APPARATUS, DISMANTLING PROCEDURE SELECTING METHOD, AND DISMANTLING APPARATUS

BACKGROUND

1. Technical Field

The present disclosure relates to a dismantling procedure selecting apparatus, a dismantling procedure selecting method, and a dismantling apparatus for dismantling an object to be dismantled that requires a different dismantling procedure for a different model of the object.

2. Description of the Related Art

Due to economic activities of mass consumption and mass disposal, global environmental problems such as global warming and resource depletion have arisen.

Under such circumstances, the Home Appliance Recycling Act has been enforced in Japan since April 2001 in order to construct a resource recycling society. The Home Appliance Recycling Act requires mandatory recycling of used home appliances (for example, air conditioners, televisions, refrigerators, freezers, washing machines, clothes dryers, and the like). Under this requirement, used home appliances are manually dismantled in an appliance recycling factory and collected by materials. Alternatively, used appliances are crushed by a crushing machine into small pieces, and then sorted and collected by material types using magnetism, wind, vibration, or the like, and recycled as recycled materials.

Since, in many appliances, a housing, a circuit board, or the like is fixed by a plurality of fixing members, these fixing members need to be removed orderly and sorted in manual dismantling of such appliances. Used appliances to be dismantled differ among products in their sizes, places where members are fixed, and methods of fixing. There are many complicated dismantling operations or processes that depend on intuition or experience of an operator, which makes automation of dismantling of appliances very difficult.

Under these circumstances, a technique of automating a part of a dismantling process has been proposed as disclosed in Patent Literature 1.

Figure 10:
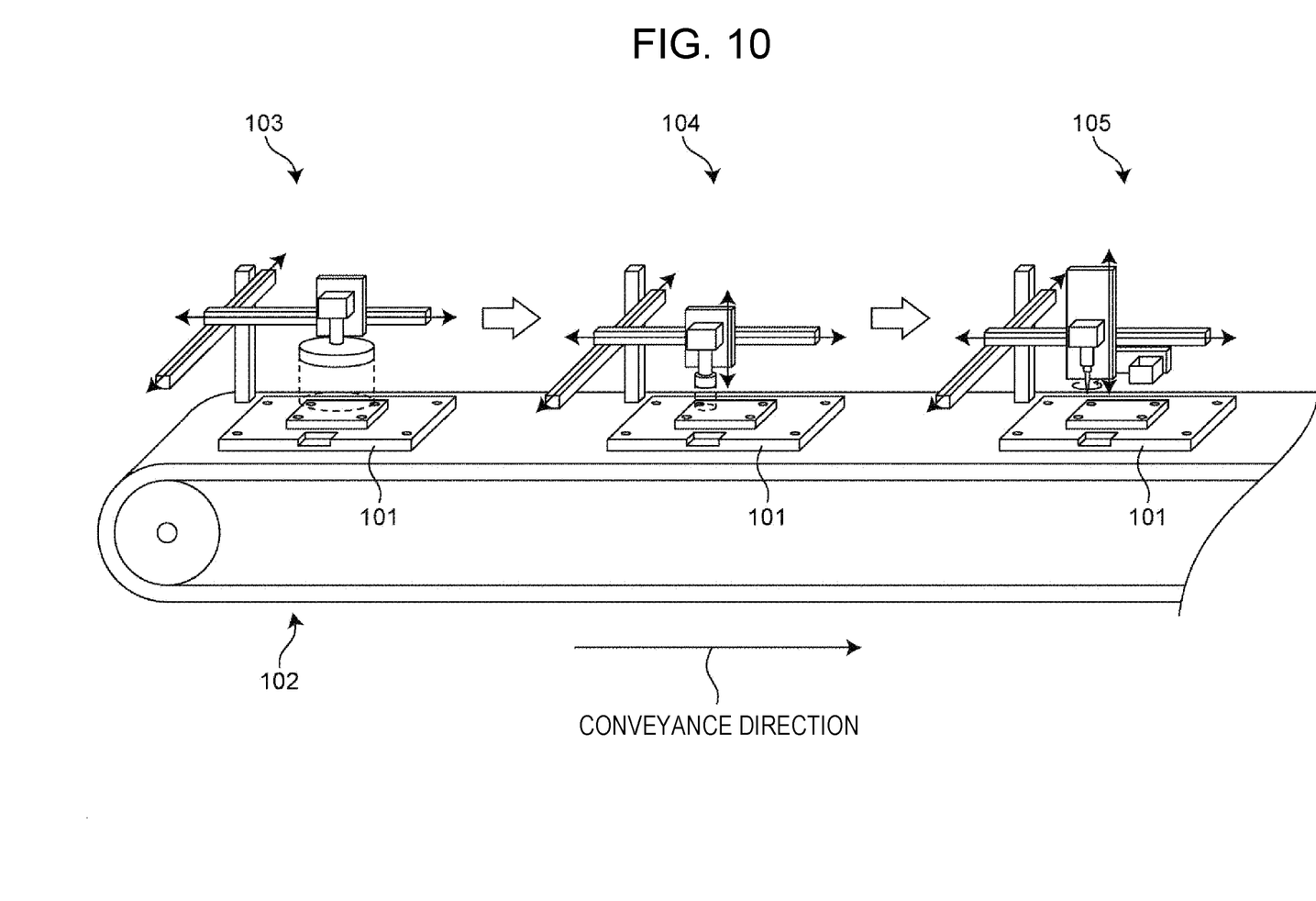
FIG. 10 is a view illustrating a conventional dismantling apparatus disclosed in Patent Literature 1.

FIG. 10 is a view illustrating a conventional dismantling apparatus disclosed in Patent Literature 1.

In FIG. 10, display panel 101 is conveyed by conveyance unit 102, first fixing member detector 103 and second fixing member detector 104 detect a place where a fixing member of a housing is fixed, and fixing member dismantling unit 105 can release the fixing by the fixing member. This configuration is effective for automating a dismantling process of a flat-panel television or the like in which fixing members are fastened along a single direction.

CITATION LIST

Patent Literature

PTL 1: Japanese Patent No. 6051501

SUMMARY

A dismantling procedure selecting apparatus according to one aspect of the present disclosure includes a dismantling information storage unit that stores a plurality of pieces of dismantling information respectively including a plurality of predetermined dismantling procedures for a plurality of dismantled objects each used as a reference for dismantling an object to be dismantled, a whole detector that captures a whole image of the object to be dismantled, a detail detector that captures an image of at least a portion of the object to be dismantled, and a dismantling procedure deriving unit that extracts a first feature as a feature of the object to be dismantled based on data obtained by capturing an image by at least one of the whole detector and the detail detector, obtains a degree of matching between the first feature and a second feature for each of a plurality of second features that are respectively features of a plurality of dismantled objects, and selects a dismantling procedure associated with one of a plurality of the dismantled objects having a second feature having a highest degree of matching among a plurality of second features.

A dismantling procedure selecting method according to another aspect of the present disclosure includes providing a dismantling information storage unit that stores a plurality of pieces of dismantling information respectively including a plurality of predetermined dismantling procedures for a plurality of dismantled objects each used as a reference for dismantling an object to be dismantled, capturing an image of the whole or a portion of the object to be dismantled by a camera, extracting by a dismantling procedure deriving unit a first feature that is a feature of the object to be dismantled based on data obtained by capturing an image, obtains by the dismantling procedure deriving unit a degree of matching between the first feature and a second feature for each of a plurality of second features that are respectively features of a plurality of dismantled objects, and selecting by the dismantling procedure deriving unit a dismantling procedure associated with one of a plurality of the dismantled objects having a second feature having a highest degree of matching among a plurality of second features.

DETAILED DESCRIPTIONS

In a conventional configuration, home appliances in which fixing members are fastened along a plurality of directions and a plurality of fastening methods are used, for example, an exterior unit of an air conditioner, can be dismantled if there is a dismantling procedure. But it is difficult to dismantle such appliances if there is no dismantling procedure. A product used outdoors is in a condition with rust, deformation, or damage, for example, which is different from a normal condition, and it is difficult to dismantle a unit by detection using image recognition or the like which is usually used.

The present disclosure has been made to solve the conventional problem described above. An object of the present disclosure is to provide a dismantling procedure selecting apparatus, a dismantling procedure selecting method, and a dismantling apparatus that enable dismantling even when no dismantling procedure is stored or when a condition of an object to be dismantled differs due to damage or deformation.

An exemplary embodiment of the present disclosure will be described in detail below with reference to the drawings.

First Exemplary Embodiment

Figure 1:
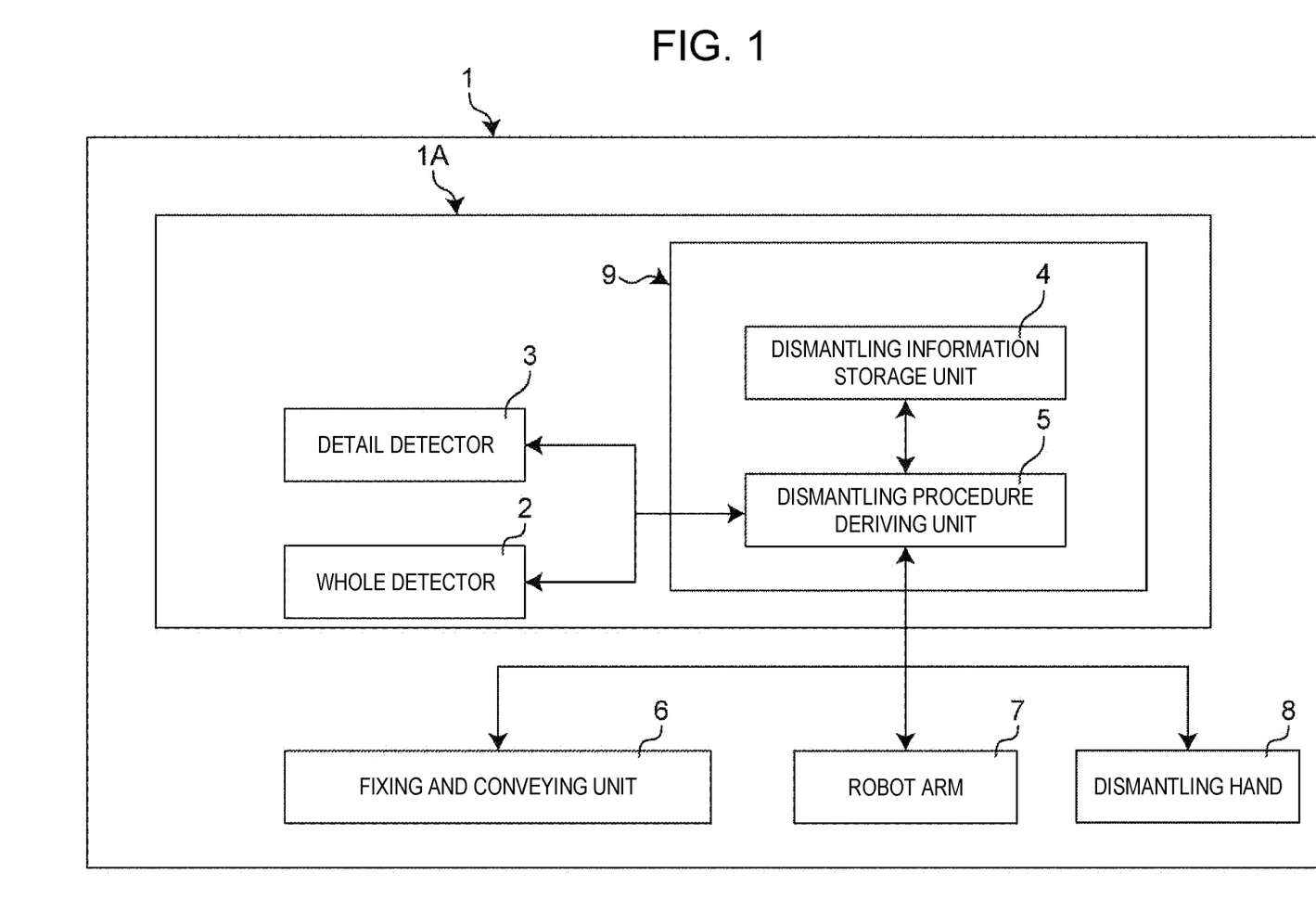
FIG. 1 is a configurational block diagram of a dismantling apparatus according to a first exemplary embodiment of the present disclosure.

FIG. 1 is a block diagram illustrating a configuration of dismantling apparatus 1 according to a first exemplary embodiment of the present disclosure. As illustrated in FIG. 1, dismantling apparatus 1 according to the first exemplary embodiment includes at least dismantling procedure selecting apparatus 1A including at least whole detector 2, detail detector 3, dismantling information storage unit 4, and dismantling procedure deriving unit 5. In dismantling procedure selecting apparatus 1A, dismantling information storage unit 4 and dismantling procedure deriving unit 5 work as controller 9 to integrally control whole detector 2 and detail detector 3.

As an example, dismantling apparatus 1 further includes fixing and conveying unit 6, robot arm 7, and dismantling hand 8. Dismantling information storage unit 4 and dismantling procedure deriving unit 5 work as controller 9 to integrally control whole detector 2, detail detector 3, fixing and conveying unit 6, robot arm 7, and dismantling hand 8.

Figure 2:
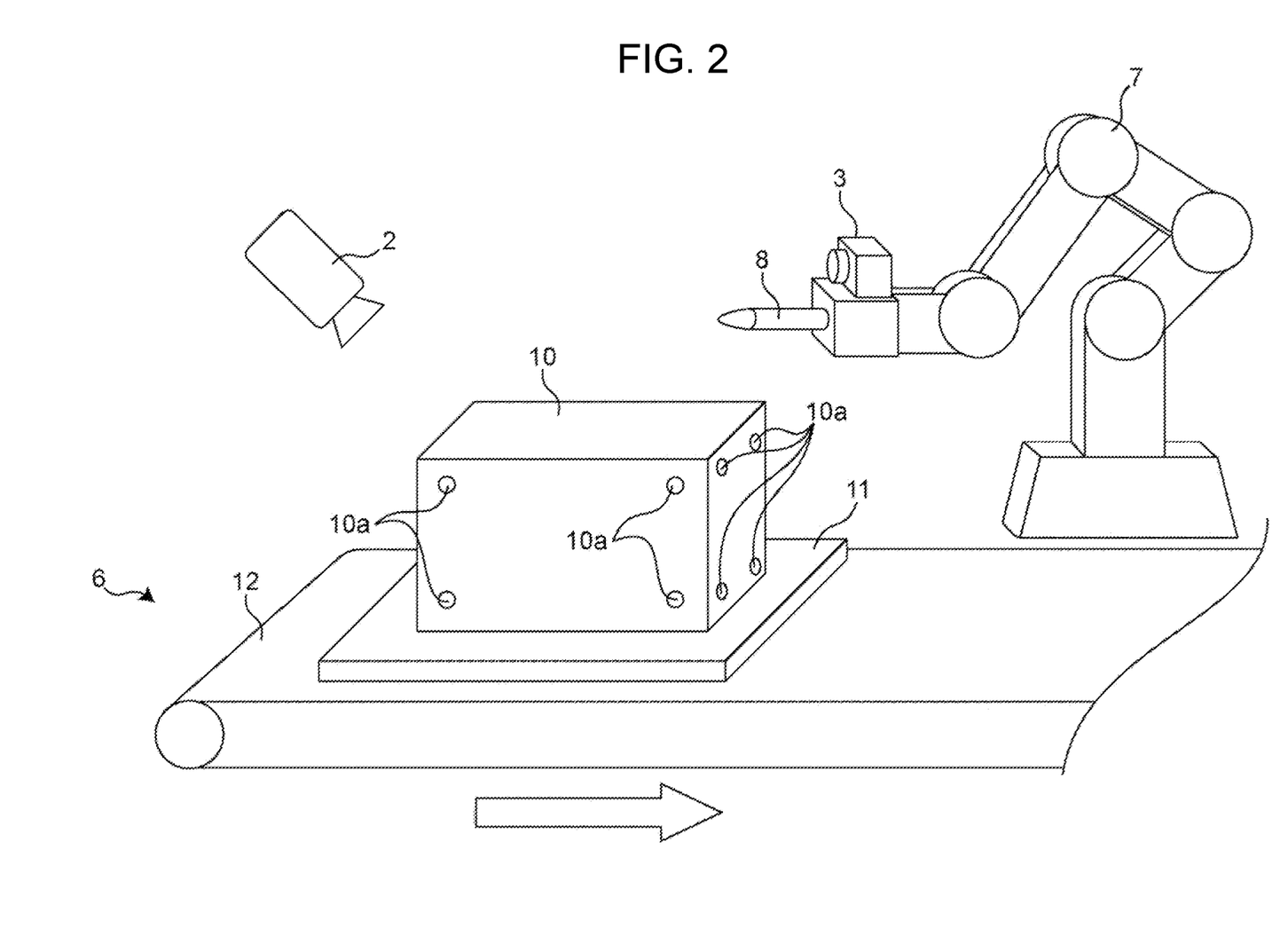
FIG. 2 is a schematic view of the dismantling apparatus according to the first exemplary embodiment of the present disclosure.

As illustrated in FIG. 2, dismantling apparatus 1 according to the first exemplary embodiment fixes object to be dismantled 10 to fixing holder 11 and conveys object to be dismantled 10 by conveyor 12.

Figure 11:
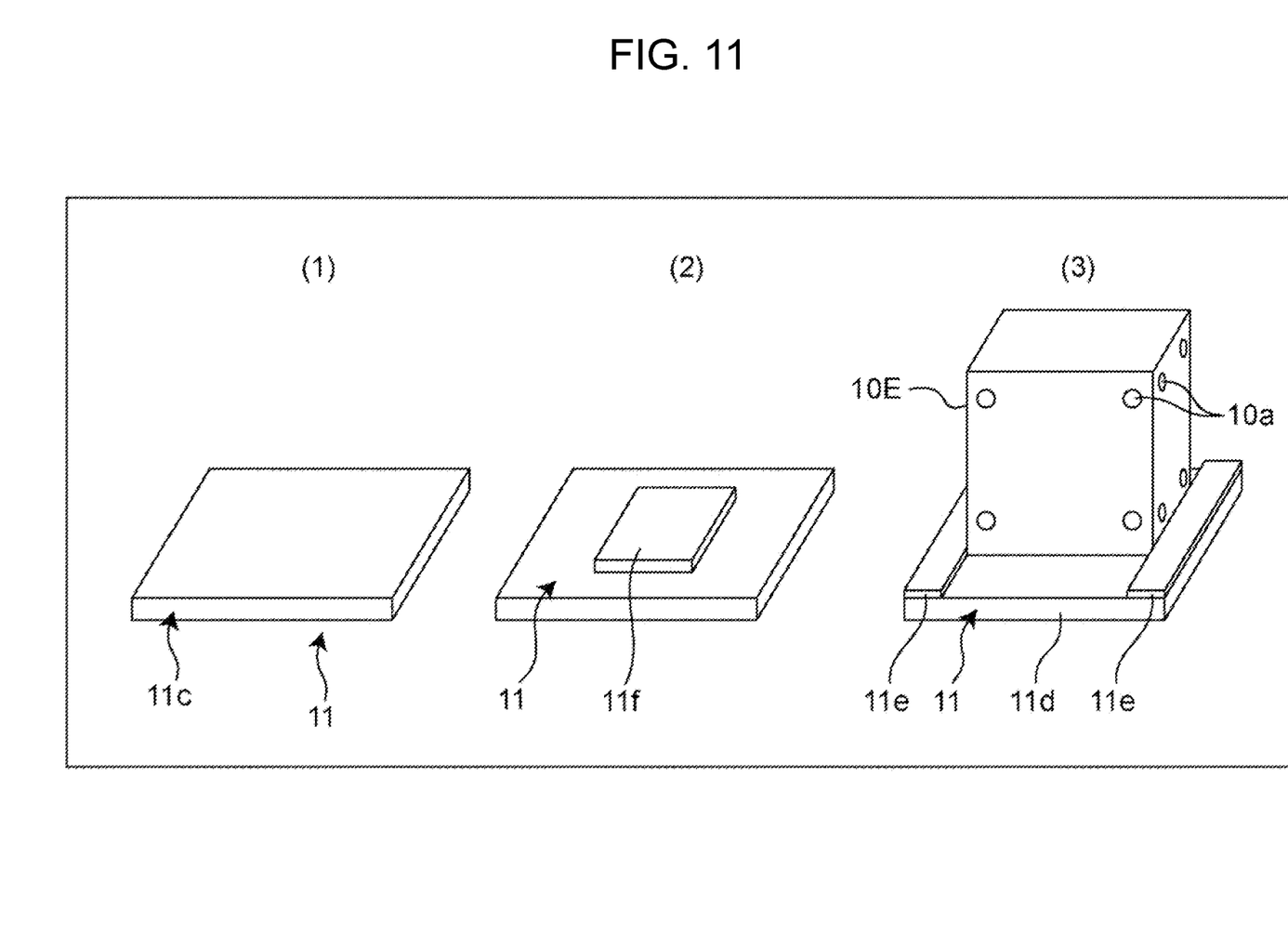
FIG. 11 is a diagram explaining a method of fixing a fixing holder taken by the dismantling apparatus according to the first exemplary embodiment of the present disclosure.

Fixing holder 11 is, for example, a plate-like member having a fixing and holding surface to which object to be dismantled 10 can be fixed. There are several methods of fixing by fixing holder 11. For example, in a method as illustrated in part (1) of FIG. 11, fixing holder 11 includes magnetized plate member 11c, and an object to be dismantled is fixed by magnetic force. In another method, as illustrated in part (2) of FIG. 11, an object to be dismantled is suctioned and fixed by its bottom surface by suction pad 11f that sucks air. In another method, as illustrated in part (3) of FIG. 11, object to be dismantled 10E is fixed by mechanically clamping a portion of object to be dismantled 10E. More specifically, in part (3) of FIG. 11, a bottom portion of object to be dismantled 10E on support base 11d is mechanically clamped and fixed by, for example, a pair of plate members 11e.

Conveyor 12 is, for example, a belt conveyor capable of conveying fixing holders 11 one after another in a conveyance direction.

Whole detector 2, for example, a camera, is disposed on the upstream side of robot arm 7 of conveyor 12, captures a whole image of object to be dismantled 10 on fixing holder 11 placed on a belt of conveyor 12, and transmits captured image data to controller 9.

Detail detector 3, for example, a camera, is disposed near dismantling hand 8 that is on the distal end of robot arm 7. For example, dismantling hand 8 is directed toward object to be dismantled 10, and detail detector 3 captures an image of a portion of object to be dismantled 10 near dismantling hand 8 of robot arm 7, and transmits the captured image data to controller 9. When, for example, detail detector 3 is moved along a boundary of a coupled portion or along a profile or a side when an image of a portion of object to be dismantled 10 is captured, a feature related to a boundary, a profile, or the like can be easily extracted by a captured image. In another example, an image is captured for a fastening portion between parts constituting a housing of object to be dismantled 10, fixing member 10a such as a screw that fixes parts constituting object to be dismantled 10, or a component of object to be dismantled 10, and a feature such as a structure of a fastening portion, positional information of fixing member 10a, or a material of a component can be extracted.

Dismantling procedure deriving unit 5 extracts a part as a feature (that is, a first feature) of object to be dismantled 10 based on captured image data obtained by at least one of whole detector 2 and detail detector 3 while object to be dismantled 10 is conveyed or at a timing when conveyance is temporarily stopped. Dismantling procedure deriving unit 5 further compares the extracted first features with a feature of dismantled object 10S (that is, a second feature) which is a reference for dismantling object to be dismantled 10, where the second feature is included in dismantling information stored in dismantling information storage unit 4. Dismantling procedure deriving unit 5 further derives, from the dismantling information, a dismantling procedure associated with a feature of dismantled object 10S that is most close to the extracted feature of object to be dismantled 10. The reference for dismantling means an object of which dismantling procedure is same as the procedure of dismantling object to be dismantled 10, and thus means an object of the same type as or a type similar to object to be dismantled 10.

Dismantling information storage unit 4 stores at least dismantling information including a dismantling procedure associated with a feature of dismantled object 10S (that is, the second feature) which will be a reference for dismantling object to be dismantled 10.

Specifically, the dismantling information includes at least a dismantling procedure of dismantling, or separating or disassembling, dismantled object 10S which is the same object as or an object similar to object to be dismantled 10 into components, and a feature of dismantled object 10S associated with the dismantling procedure.

The feature includes at least one of boundary line 10Sb (for example, positional information of boundary line 10Sb) of a boundary at, for example, a coupled portion of components of dismantled object 10S, a structure of a fastening portion between parts constituting a housing of dismantled object 10S, positional information of a fixing member, such as a screw, that fixes parts constituting dismantled object 10S, and a material of a component of dismantled object 10S. When comparing the features of object to be dismantled 10 and dismantled object 10S, comparison is done between boundary lines (for example, positional information of boundary lines), structures of fastening portion, positional information of fixing members, or materials.

Under the control of dismantling procedure deriving unit 5, object to be dismantled 10 is dismantled in order by robot arm 7 and dismantling hand 8 according to the dismantling procedure derived by dismantling procedure deriving unit 5.

As an example of object to be dismantled 10, an air conditioner exterior unit of a home appliance will be described in more detail below.

Figure 3:
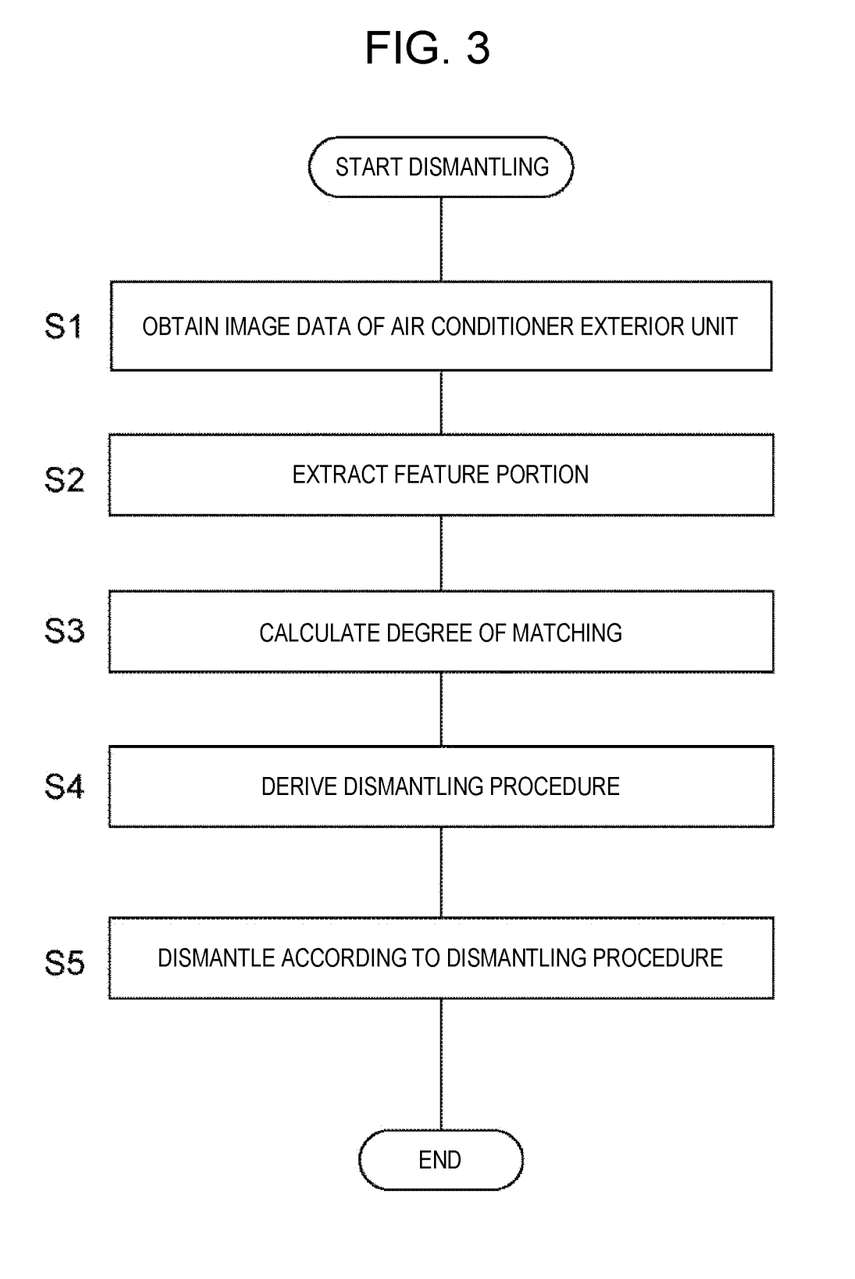
FIG. 3 is a flowchart of dismantling in the first exemplary embodiment of the present disclosure.

As illustrated in FIG. 2, object to be dismantled 10 is fixed to fixing holder 11 and conveyed by conveyor 12. A dismantling flow will be described based on a dismantling flowchart illustrated in FIG. 3. After at least one of whole detector 2 and detail detector 3 captures an image, dismantling starts at a timing when an object being conveyed passes a certain position (for example, a position where whole detector 2 can capture an image of object to be dismantled 10) or a timing when conveyance is temporarily stopped.

Figure 4A:
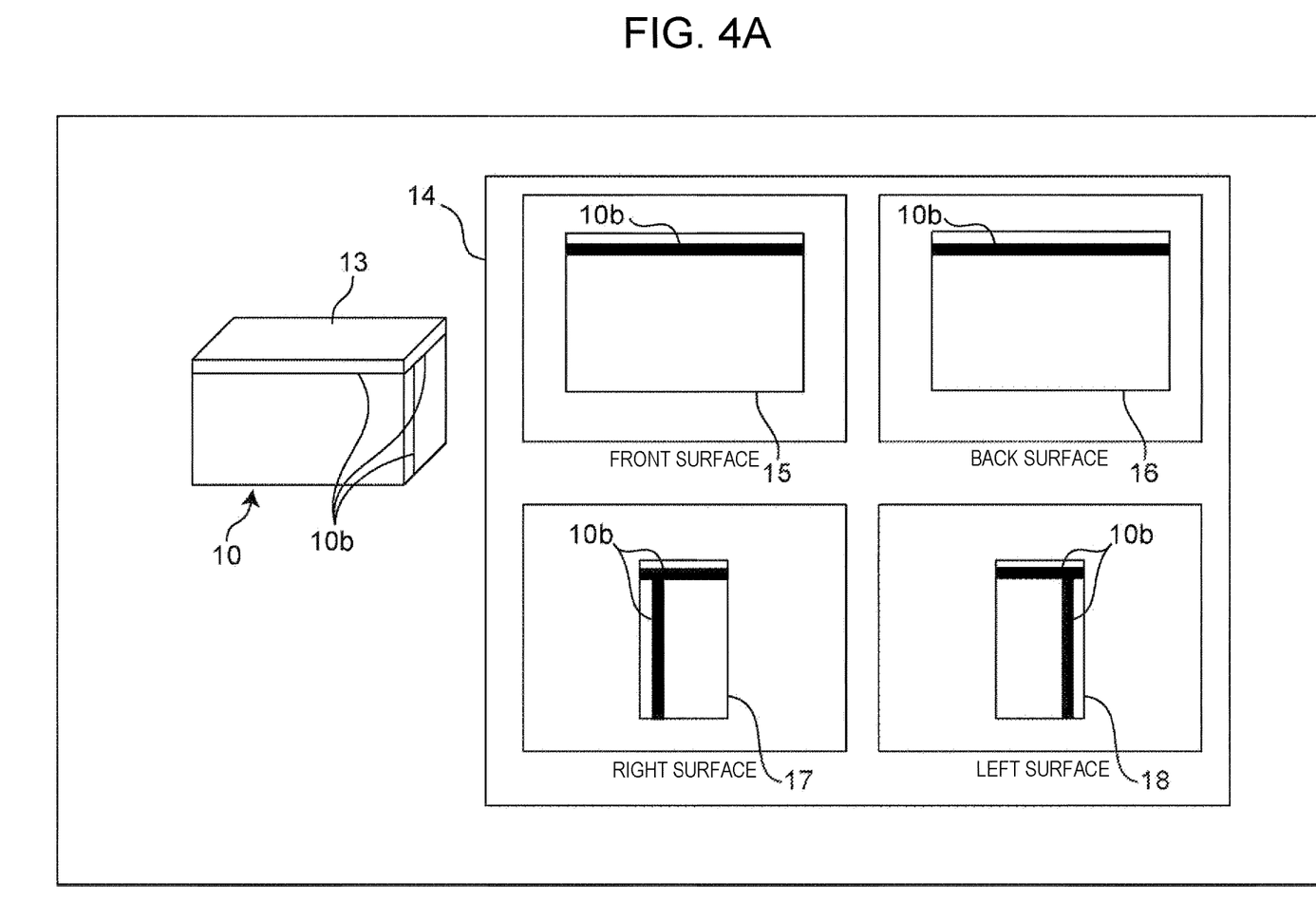
FIG. 4A is a diagram explaining extraction of a feature portion by the dismantling apparatus according to the first exemplary embodiment of the present disclosure.

First, in step S1, dismantling apparatus 1 obtains by controller 9 captured image data of air conditioner exterior unit 14 of air conditioner exterior unit 13 as illustrated in FIG. 4A from at least one of whole detector 2 and detail detector 3. Captured image data of air conditioner exterior unit 14 is captured image data of the whole air conditioner exterior unit 13 when the image is captured by whole detector 2, and is captured image data of a portion of air conditioner exterior unit 13 when the image is captured by detail detector 3.

Next, in step S2, dismantling apparatus 1 extracts by dismantling procedure deriving unit 5 a portion as a feature of object to be dismantled 10 from captured image data of air conditioner exterior unit 14 obtained in step S1. Dismantling apparatus 1 uses a learning model in which the captured image data of a plurality of exterior units is previously learned by machine learning using, for example, a method such as template matching to extract a portion as a feature by dismantling procedure deriving unit 5. Specifically, when dismantling apparatus 1 extracts, for example, shape features from a front surface, a back surface, a right surface, and a left surface of air conditioner exterior unit 13 in FIG. 4A as an example of object to be dismantled 10, dismantling procedure deriving unit 5 extracts features related to coupled portions on the surfaces such as front surface feature 15, back surface feature 16, right surface feature 17, and left surface feature 18 (for example, a thin black belt indicating the boundary between coupled portions as boundary line 10b) from air conditioner exterior unit 13.

Figure 4B:
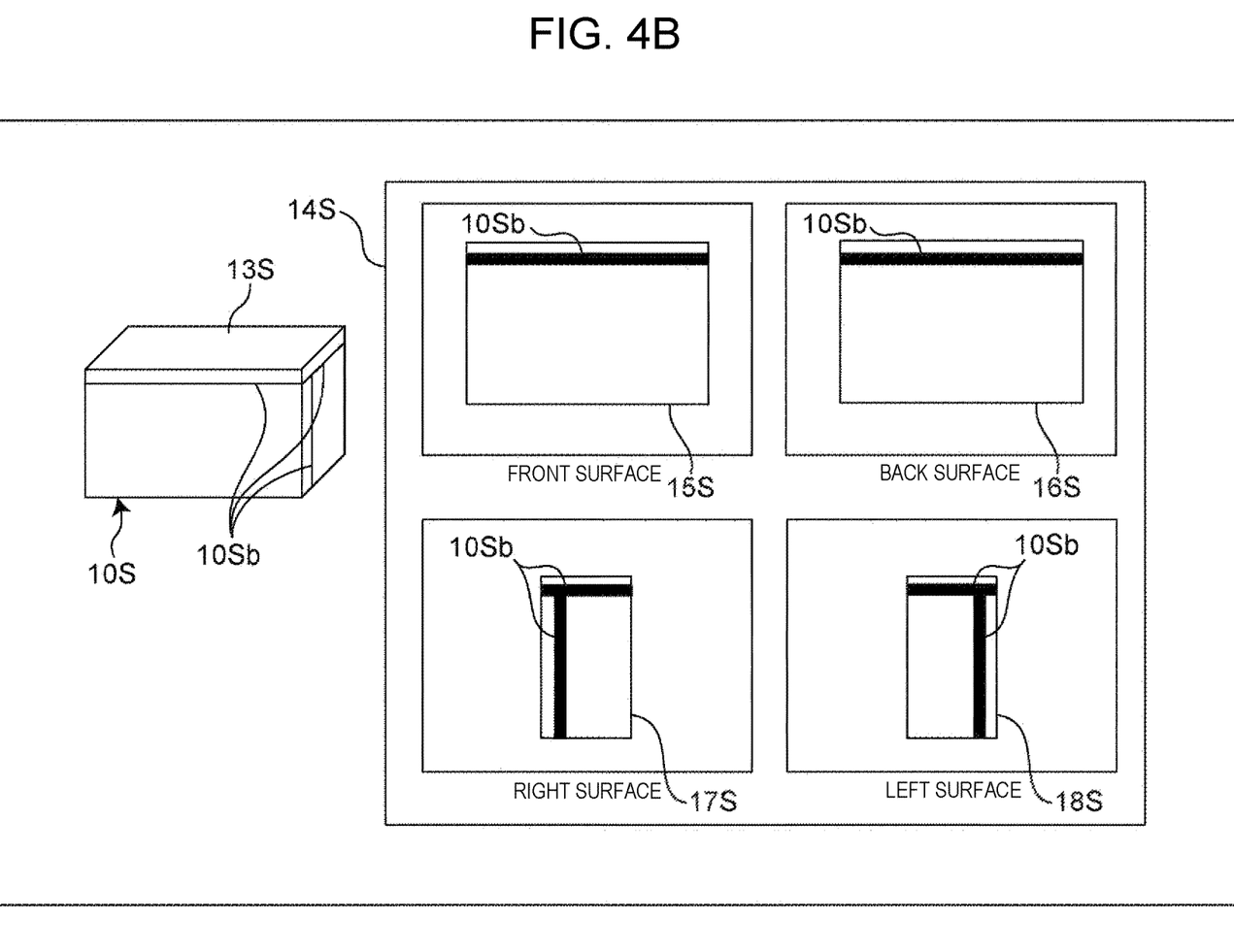
FIG. 4B is a diagram explaining an example feature portion stored in a dismantling information storage unit of the dismantling apparatus according to the first exemplary embodiment of the present disclosure.

Features of dismantled object 10S which is a reference for dismantling object to be dismantled 10 in this example are, as illustrated in FIG. 4B, features related to coupled portions on surfaces of air conditioner exterior unit 13S such as front surface feature 15S, back surface feature 16S, right surface feature 17S, and left surface feature 18S (for example, a thin black belt indicating the boundary of coupled portions as boundary line 10Sb). Captured image data of air conditioner exterior unit 14S includes the features of dismantled object 10S. Dismantling information storage unit 4 stores captured image data of air conditioner exterior unit 14S.

Figure 5:
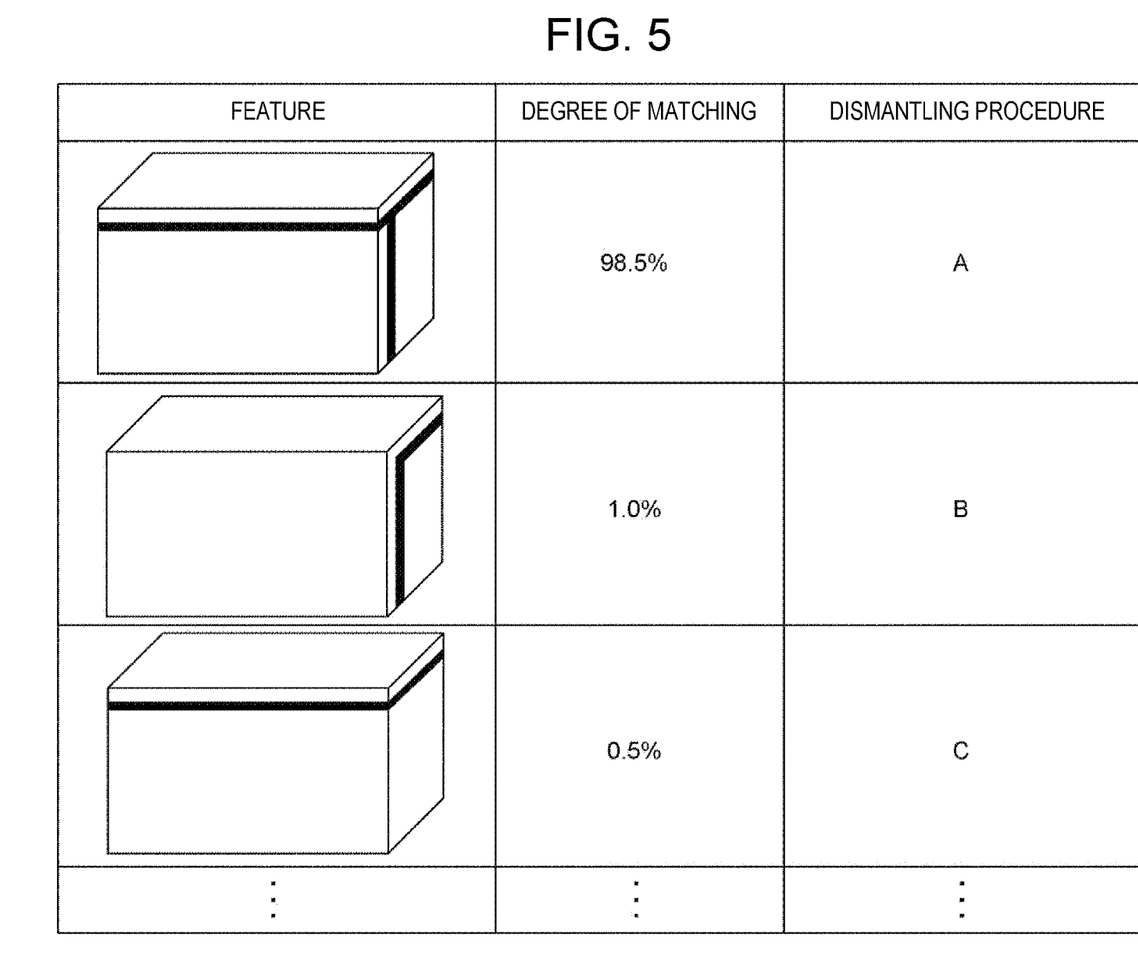
FIG. 5 is a diagram explaining derivation of a dismantling procedure by the dismantling apparatus based on a degree of matching according to the first exemplary embodiment of the present disclosure.

Next, in step S3, dismantling apparatus 1 compares by dismantling procedure deriving unit 5 the features extracted in step S2 with the features included in the dismantling information stored in dismantling information storage unit 4 as illustrated in FIG. 5, and calculates a degree of matching.

For example, comparison between the features extracted in FIG. 4A and the stored features in FIG. 4B corresponds to comparison of features in the top part of the table in FIG. 5. The degree of matching of 98.5% corresponds to dismantling procedure A. In another example, the degree of matching of comparison between features in the second part of the table in FIG. 5 and the features in FIG. 4A is 1.0%, and this degree of matching corresponds to dismantling procedure B. The degree of matching of comparison between features in the bottom part of the table in FIG. 5 and the features in FIG. 4A is 0.5%, and this degree of matching corresponds to dismantling procedure C. These indicate that the dismantling procedure differs depending on the degree of matching of comparison of features.

Next, in step S4, dismantling apparatus 1 derives by dismantling procedure deriving unit 5 a dismantling procedure associated with a feature having the highest degree of matching among the degrees of matching obtained in step S3 as a dismantling procedure of a high priority. In the above example, dismantling apparatus 1 derives by dismantling procedure deriving unit 5 dismantling procedure A, which is associated with the feature having the highest degree of matching. Accordingly, even if there is no feature of matching of 100%, dismantling apparatus 1 can derive and select by dismantling procedure deriving unit 5 a dismantling procedure associated with a feature that is most closes to the extracted feature among the features stored in dismantling information storage unit 4.

Figure 6:
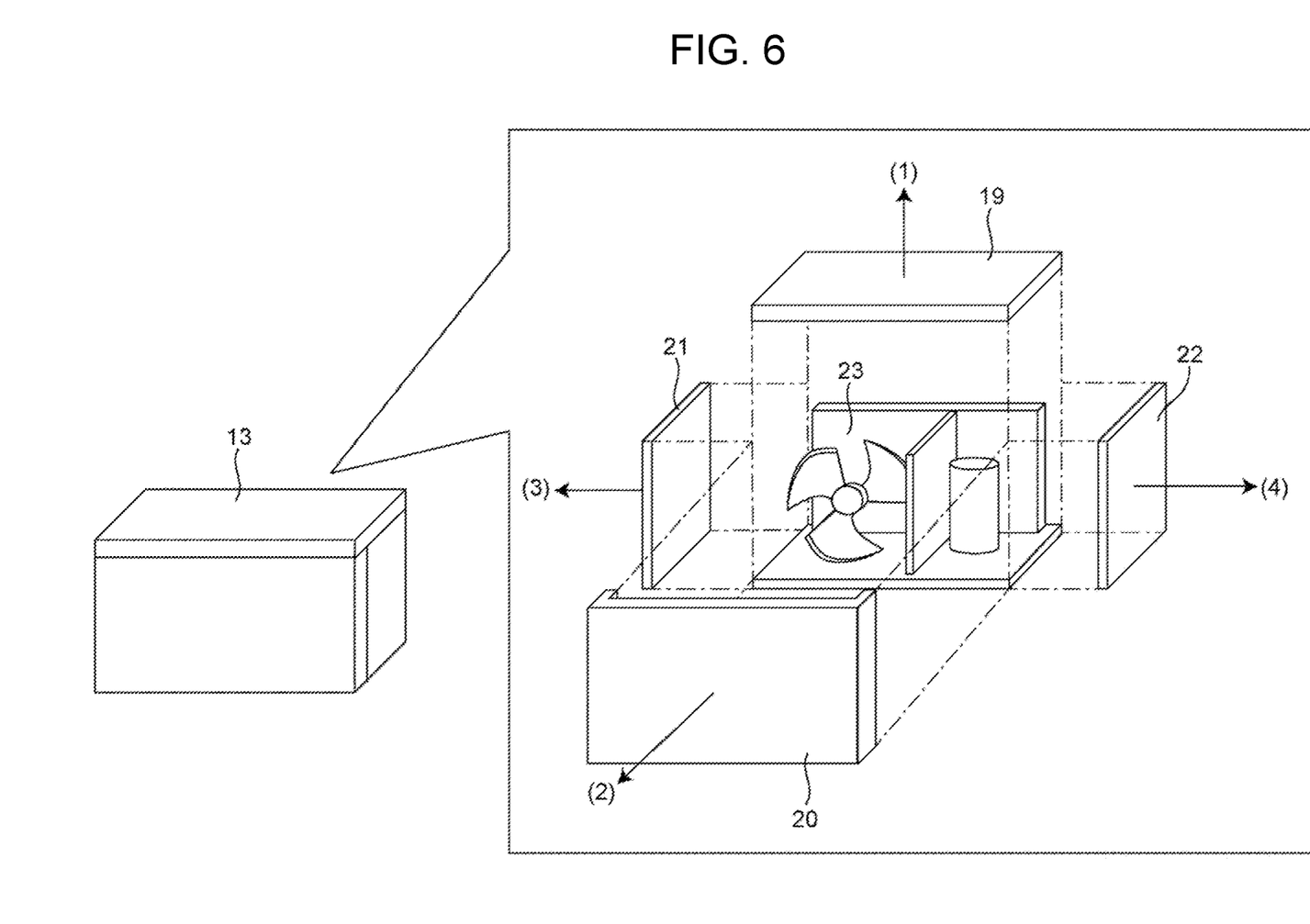
FIG. 6 is a diagram explaining dismantling procedure A taken by the dismantling apparatus according to the first exemplary embodiment of the present disclosure.

Next, in step S5, dismantling apparatus 1 dismantles object to be dismantled 10, under the control of dismantling procedure deriving unit 5, by robot arm 7 and dismantling hand 8 following the dismantling procedure derived by dismantling procedure deriving unit 5. When the result is as illustrated in FIG. 5, dismantling apparatus 1 follows the order from (1) to (4) in FIG. 6 which is dismantling procedure A corresponding to the highest degree of matching. Following this order, dismantling apparatus 1 dismantles object to be dismantled 10 in order, like from upper face cover 19, front face cover 20, left side face cover 21, right side face cover 22, and internal component 23.

In the first exemplary embodiment, the method for extracting feature portions in step S2 can be appropriately selected according to object to be dismantled 10. In the first exemplary embodiment described above, a learning model that has learned by machine learning is used. In a case where a feature is apparent, the feature may be extracted from captured image data using a simple image processing method such as contour extraction. For a complicated feature portion, the feature may be extracted by a combination of a learning model that has learned by machine learning and a simple image processing method such as contour extraction.

As described above, the first exemplary embodiment includes dismantling procedure deriving unit 5 that extracts a part as a feature of object to be dismantled 10 based on captured image data, obtains a degree of matching between the extracted feature and a feature stored in dismantling information storage unit 4, and selects a dismantling procedure stored in dismantling information storage unit 4 and associated with the feature having the highest degree of matching, and can perform dismantling by the dismantling procedure derived by dismantling procedure deriving unit 5. This enables dismantling even when no dismantling procedure is stored or when the condition of object to be dismantled 10 differs due to damage or deformation. As a result, dismantling can be performed without relying on manpower even for used home appliances requiring different dismantling methods for different manufacturers, model numbers, or the like. Thus, labor of dismantling object to be dismantled 10 can be reduced.

Exemplary Modifications of First Exemplary Embodiment

Figure 7:
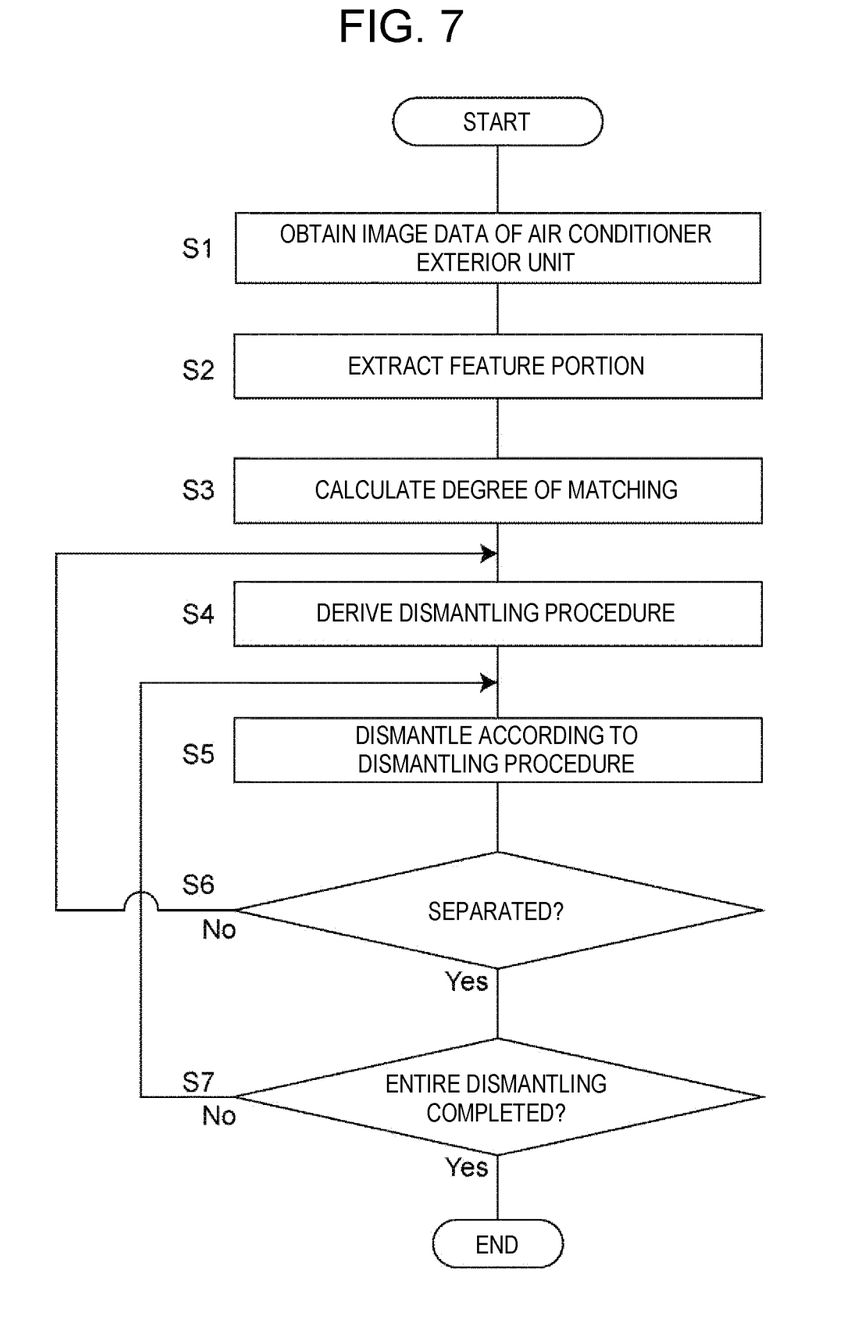
FIG. 7 is a flowchart of deciding whether dismantling has been done in the first exemplary embodiment of the present disclosure.

An exemplary modification of the first exemplary embodiment will be described. For used home appliance as described in the first exemplary embodiment, object to be dismantled 10 may be damaged or deformed depending on how it has been used by an owner or a condition in a storage site for discarded home appliances. In this regard, the dismantling flow for dismantling procedure deriving unit 5 may additionally have, after step S5 in FIG. 3, step S6 of determining whether separation is done and step S7 of determining whether dismantling is completed as illustrated in FIG. 7.

In step S6, dismantling apparatus 1 determines by dismantling procedure deriving unit 5 whether a target part of dismantling is dismantled, for example, separated from object to be dismantled 10 according to a difference between the captured image data of object to be dismantled 10 previously obtained by whole detector 2 or detail detector 3 before dismantling and the captured image data of object to be dismantled 10 obtained by whole detector 2 or detail detector 3 after dismantling. By performing step S6, dismantling apparatus 1 can detect a part that cannot be dismantled due to damage or deformation of object to be dismantled 10.

When dismantling has been done by step S6, dismantling apparatus 1 determines in step S7 by dismantling procedure deriving unit 5 whether the entire dismantling has been completed. When the entire dismantling has not been completed, dismantling apparatus 1 dismantles in step S5 a cover which is the next part to be dismantled according to the order of dismantling.

When dismantling has not been done by step S6, dismantling apparatus 1 derives in step S4 a dismantling procedure corresponding to the next highest degree of matching after the degree of matching obtained immediately before among the degrees of matching obtained in step S3, and repeats steps S4 to S6 until dismantling is all completed.

In step S7, dismantling apparatus 1 repeats steps S5 to S7 until the entire dismantling is completed. This enables dismantling in any condition regardless of any damage or deformation, for example, of object to be dismantled 10.

In addition, dismantling apparatus 1 newly stores by dismantling procedure deriving unit 5 the dismantling procedure by which dismantling is done by step S6 and the feature of object to be dismantled 10 extracted in step S2 in association with each other in dismantling information storage unit 4. This allows from the next time greatly shortening the processing time for dismantling the same kind of object to be dismantled 10.

Second Exemplary Embodiment

Figure 8:
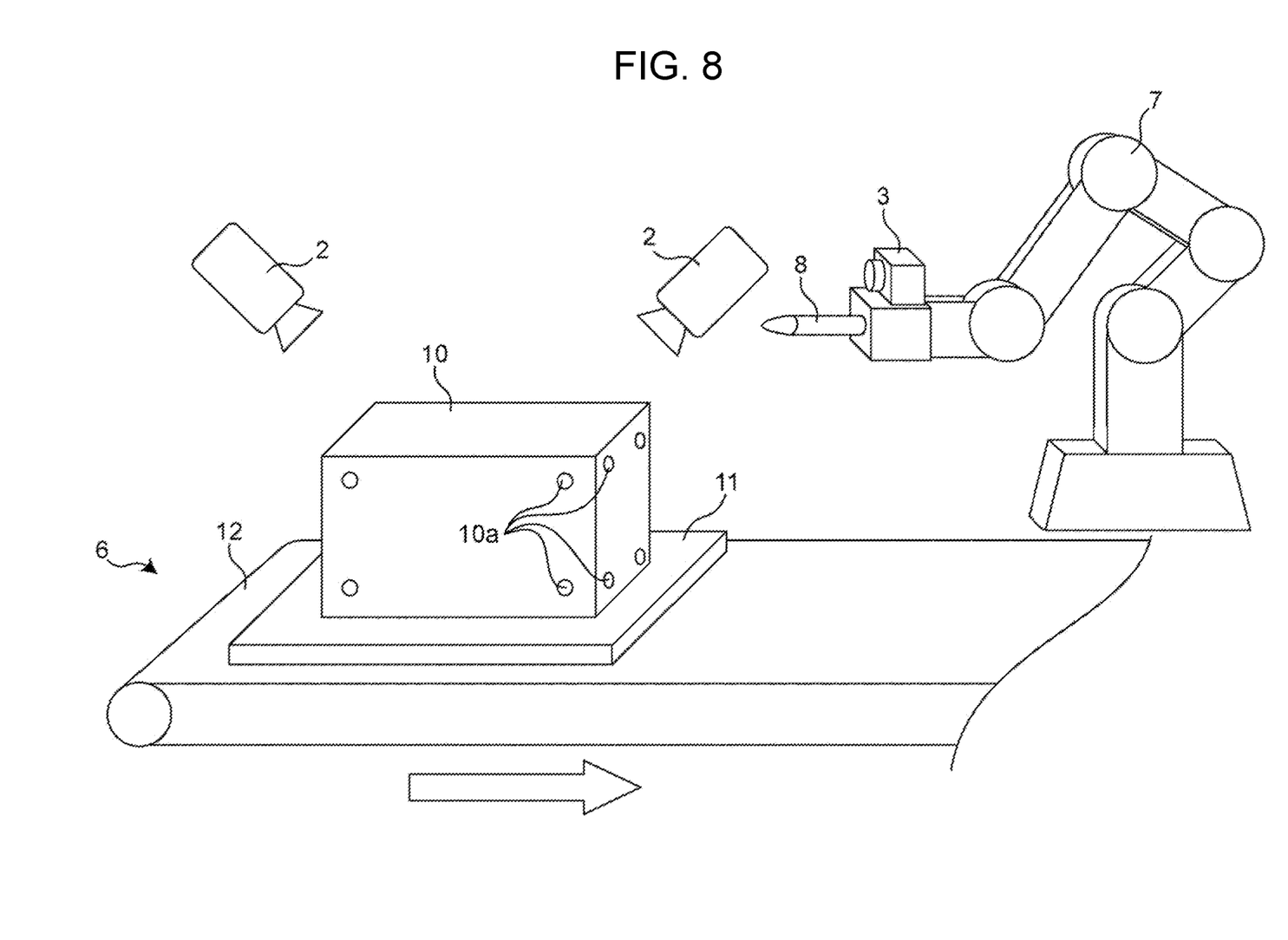
FIG. 8 is a schematic view of a dismantling apparatus according to a second exemplary embodiment of the present disclosure.

FIG. 8 is a schematic view of dismantling apparatus 1 according to a second exemplary embodiment of the present disclosure. In FIG. 8, the same component as that in FIG. 2 is denoted by the same reference mark, and description thereof will be omitted.

Dismantling apparatus 1 according to the second exemplary embodiment of the present disclosure illustrated in FIG. 8 includes a plurality of whole detectors 2 surrounding object to be dismantled 10 to obtain captured image data. As an example, a pair of cameras may be disposed to be directed toward the conveyance direction. Specifically, for example, a camera of first whole detector 2 that captures an image of object to be dismantled 10 from the upstream side in the conveyance direction and a camera of second whole detector 2 that captures an image of object to be dismantled 10 from the downstream side in the conveyance direction may be disposed. In an alternative manner, for example, a camera of third whole detector 2 that captures an image of object to be dismantled 10 from one side in a width direction intersecting the conveyance direction and a camera of fourth whole detector 2 that captures an image of object to be dismantled 10 from the other side in the width direction may be disposed.

In this manner, images of object to be dismantled 10 on the fixing holder can be captured without a blind spot, and a feature can be more accurately and easily extracted. In other words, this allows detection from a plurality of directions, and thus the accuracy of feature extraction improves. In addition, this reduces the number of times of detection as compared with the first exemplary embodiment, and the time for detection (and thus the time required for dismantling) can be shortened.

Third Exemplary Embodiment

Figure 9:
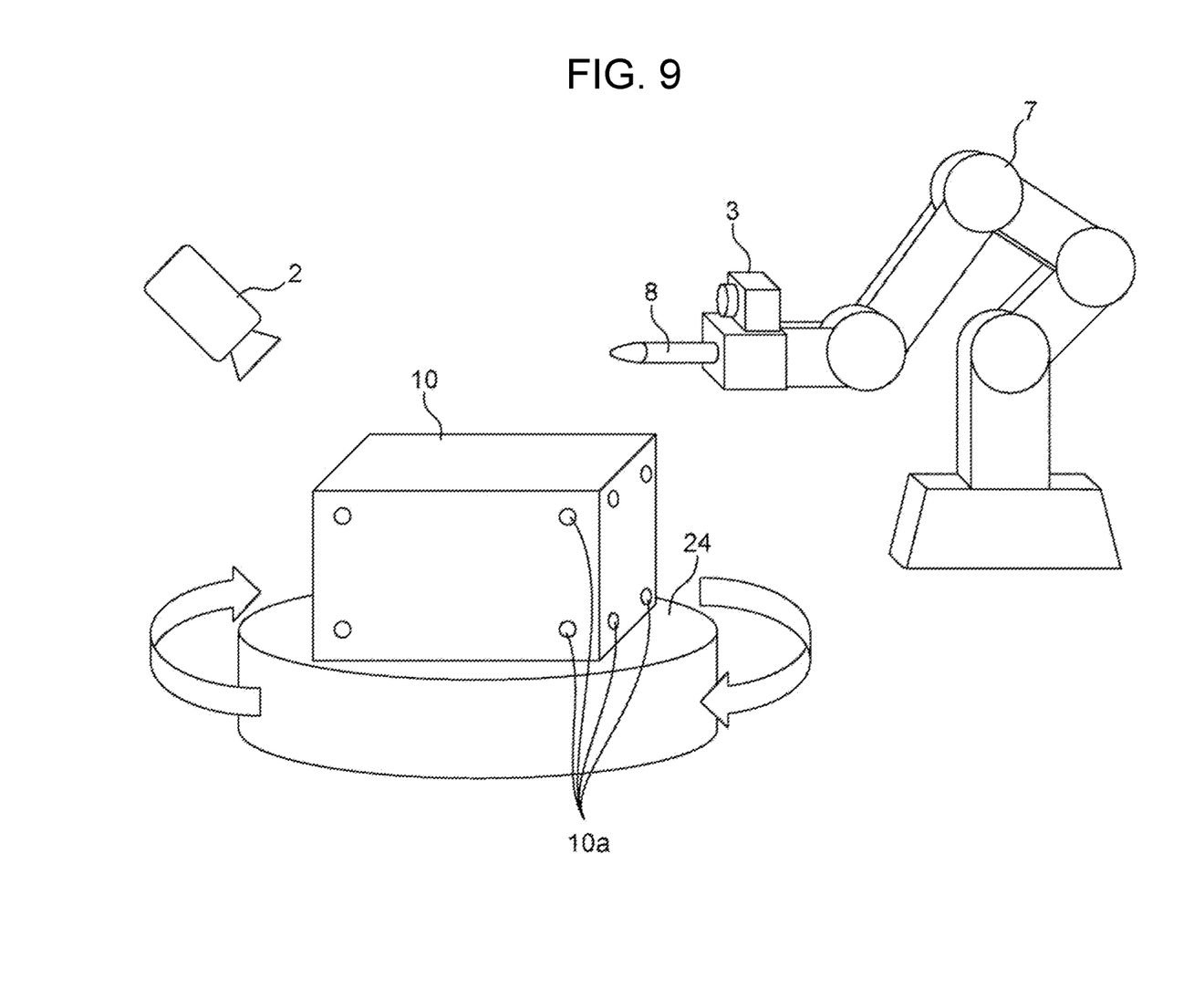
FIG. 9 is a schematic view of a dismantling apparatus according to a third exemplary embodiment of the present disclosure.

FIG. 9 is a schematic view of dismantling apparatus 1 according to a third exemplary embodiment of the present disclosure. In FIG. 9, the same component as that in FIG. 2 and FIG. 8 is denoted by the same reference mark, and description thereof will be omitted.

The third exemplary embodiment of the present disclosure illustrated in FIG. 9 is provided with fixing and turning unit 24 to obtain captured image data while rotating object to be dismantled 10. Instead of conveying by conveyor 12, fixing and turning unit 24 turns object to be dismantled 10 on a turntable by a motor or the like.

With this configuration, detection can be performed without moving whole detector 2 or detail detector 3 to perform detection from a plurality of directions. This enables shortening the time for moving whole detector 2 or detail detector 3. In addition, since there is no need to provide a plurality of detectors as in the second exemplary embodiment, the third exemplary embodiment can be implemented with low cost.

Note that, any proper combination among the exemplary embodiments and exemplary modifications described above may have the effects of the combined ones among the exemplary embodiments and the exemplary modifications. A combination of exemplary embodiments, examples, or an exemplary embodiment and an example, a combination of different exemplary embodiments, and a combination of features of examples can be made.

As described above, the dismantling procedure selecting apparatus, the dismantling procedure selecting method, and the dismantling apparatus according to the aspects of the present disclosure includes the dismantling procedure deriving unit that extracts a part as a feature of the object to be dismantled based on captured image data, obtains a degree of matching between the extracted feature and a feature stored in the dismantling information storage unit, and selects a dismantling procedure stored in the dismantling information storage unit and associated with the feature having the highest degree of matching, and can perform dismantling according to the dismantling procedure derived by the dismantling procedure deriving unit. This enables dismantling even when no dismantling procedure is stored or when the condition of the object to be dismantled differs due to damage or deformation. As a result, dismantling can be performed without relying on manpower even for used home appliances requiring different dismantling methods for different manufacturers, model numbers, or the like. Thus, labor of dismantling an object to be dismantled can be reduced.

Use of the dismantling procedure selecting apparatus, the dismantling procedure selecting method, and the dismantling apparatus according to the above aspect of the present disclosure can make a departure from dismantling processes relying on manpower. Conventionally, fixing members are in different positions and different dismantling methods are required for different models. This has made it difficult to automate dismantling. Solving this problem enables labor saving and further facilitation of resource utilization of used home appliances.

What is claimed is:

1. A dismantling procedure selecting apparatus comprising:
   a dismantling information storing memory that stores a plurality of pieces of dismantling information respectively including a plurality of predetermined dismantling procedures for a plurality of dismantled objects each used as a reference for dismantling an object to be dismantled;
   a whole detector that captures a whole image of the object to be dismantled;
   a detail detector that captures an image of at least a portion of the object to be dismantled; and
   a dismantling procedure deriver that extracts a first feature as a feature of the object to be dismantled based on data obtained by capturing an image by at least one of the whole detector and the detail detector, obtains a degree of matching between the first feature and a second feature for each of a plurality of second features that are respectively features of the plurality of dismantled objects, and selects a dismantling procedure associated with one of the plurality of the dismantled objects having a second feature having a highest degree of matching among the plurality of second features, wherein
   the plurality of dismantling procedures are respectively procedures of separating or disassembling the plurality of dismantled objects by components, and
   each of the plurality of pieces of dismantling information includes
   one of the plurality of dismantling procedures, and
   a second feature, among the plurality of second features, associated with the one of the plurality of dismantling procedures,
   the first feature includes at least one of
   a structure of a fastening portion between parts constituting a housing of the object to be dismantled,
   positional information of a fixing member that fixes parts, constituting the object to be dismantled, to each other, and
   a material of a part constituting the object to be dismantled, and
   each of the plurality of second features includes at least one of
   a structure of a fastening portion between parts constituting a housing of a respective one of the plurality of dismantled objects,
   positional information of a fixing member that fixes parts, constituting the respective one of the plurality of dismantled objects, to each other, and
   a material of a part constituting the respective one of the plurality of dismantled objects.

2. The dismantling procedure selecting apparatus according to claim 1, wherein
   each of the plurality of dismantling procedures is a procedure of separating or disassembling a respective one of the plurality of dismantled objects by components,
   each of the plurality of pieces of dismantling information includes
   the one of the plurality of dismantling procedures, and
   a second feature, among the plurality of second features, associated with the one of the plurality of dismantling procedures,
   the first feature is a boundary line of a boundary between parts constituting the object to be dismantled, and
   each of the plurality of second features is a boundary line of a boundary between parts constituting a respective one of the plurality of dismantled objects.

3. The dismantling procedure selecting apparatus according to claim 1, wherein the dismantling procedure deriver extracts a predetermined feature of a target part of dismantling as the first feature from the data obtained by capturing the image by the whole detector or the detail detector.

4. The dismantling procedure selecting apparatus according to claim 1, wherein the dismantling procedure deriver determines whether a target part of dismantling is dismantled from the object to be dismantled according to a difference between data of the object to be dismantled previously obtained by capturing an image before dismantling by the whole detector or the detail detector and data of the object to be dismantled obtained by capturing an image by the whole detector or the detail detector after dismantling according to the dismantling procedure.

5. The dismantling procedure selecting apparatus according to claim 4, wherein the dismantling procedure deriver selects, when dismantling of the target part of dismantling from the object to be dismantled fails, a dismantling procedure associated with a second feature indicating a second highest degree of matching among the plurality of second features.

6. The dismantling procedure selecting apparatus according to claim 5, wherein when dismantling of the target part of dismantling from the object to be dismantled fails and the dismantling procedure associated with the second feature indicating the second highest degree of matching among the plurality of second features is selected, the dismantling procedure deriver
   performs dismantling according to the dismantling procedure associated with the second feature indicating the second highest degree of matching,
   performs, when dismantling still cannot be done, dismantling according to a dismantling procedure associated with a second feature indicating a third highest degree of matching,
   repeats changing of dismantling procedures until dismantling is done, and
   stores a last selected dismantling procedure and the first feature in the dismantling information storing memory with the last selected dismantling procedure and the first feature associated with each other.

7. A dismantling apparatus comprising:
the dismantling procedure selecting apparatus according to claim 1; and
a robot arm that dismantles the object to be dismantled according to the dismantling procedure selected by the dismantling procedure selecting apparatus.

8. A dismantling procedure selecting method comprising:
providing a dismantling information storing memory that stores a plurality of pieces of dismantling information respectively including a plurality of predetermined dismantling procedures for a plurality of dismantled objects each used as a reference for dismantling an object to be dismantled;
capturing an image of a whole or a portion of the object to be dismantled by a camera;
extracting by a dismantling procedure deriver a first feature that is a feature of the object to be dismantled based on data obtained by capturing the image;
obtaining by the dismantling procedure deriver a degree of matching between the first feature and each of a plurality of second features that are respectively features of the plurality of dismantled objects; and
selecting by the dismantling procedure deriver a dismantling procedure associated with one of the plurality of the dismantled objects having a second feature having a highest degree of matching among the plurality of second features, wherein
the plurality of dismantling procedures are respectively procedures of separating or disassembling the plurality of dismantled objects by components, and
each of the plurality of pieces of dismantling information includes
one of the plurality of dismantling procedures, and
a second feature, among the plurality of second features, associated with the one of the plurality of dismantling procedures,
the first feature includes at least one of
a structure of a fastening portion between parts constituting a housing of the object to be dismantled,
positional information of a fixing member that fixes parts, constituting the object to be dismantled, to each other, and
a material of a part constituting the object to be dismantled,
each of the plurality of second features includes at least one of
a structure of a fastening portion between parts, constituting a respective one of the plurality of dismantled objects, to each other
positional information of a fixing member that fixes parts, constituting the respective one of the plurality of dismantled objects, to each other, and
a material of a part constituting a respective one of the plurality of dismantled objects.

9. The dismantling procedure selecting method according to claim 8, wherein each of the plurality of dismantling procedures is a procedure of separating or disassembling a respective one of the plurality of dismantled objects by components, and
each of the plurality of pieces of dismantling information includes
the one of the plurality of dismantling procedures, and
a second feature, among the plurality of second features, associated with the one of the plurality of dismantling procedures, the first feature being a boundary line of a boundary between parts constituting the object to be dismantled, each of the plurality of second features being a boundary line of a boundary between parts constituting a respective one of the plurality of dismantled objects.

10. The dismantling procedure selecting method according to claim 8, wherein in the extracting, a predetermined feature of a target part of dismantling is extracted as the first feature from the data.

11. The dismantling procedure selecting method according to claim 8, wherein after the dismantling procedure is selected and when performing the dismantling procedure that is selected, determining, by the dismantling procedure deriver, whether a target part of dismantling is dismantled from the object to be dismantled according to a difference between data of the object to be dismantled previously obtained by capturing the image before dismantling and data of the object to be dismantled obtained by capturing the image after dismantling.

12. The dismantling procedure selecting method according to claim 11, wherein after the dismantling procedure is selected and when performing the dismantling procedure that is selected, selecting a dismantling procedure associated with a second feature indicating a second highest degree of matching among the plurality of second features when dismantling of the target part of dismantling from the object to be dismantled fails.

13. The dismantling procedure selecting method according to claim 12, wherein
when dismantling of the target part of dismantling from the object to be dismantled fails and the dismantling procedure associated with the second feature indicating the second highest degree of matching among the plurality of second features is selected, performing, by the dismantling procedure deriver, dismantling according to the dismantling procedure associated with the second feature indicating the second highest degree of matching,
performing, when dismantling still cannot be done, dismantling according to a dismantling procedure associated with a second feature indicating a third highest degree of matching, and
repeating changing of dismantling procedures until dismantling is done, and
storing a last selected dismantling procedure and the first feature in the dismantling information storing memory with the last selected dismantling procedure and the first feature associated with each other.

* * * * *